(12) United States Patent
Peterson

(10) Patent No.: US 8,310,447 B2
(45) Date of Patent: Nov. 13, 2012

(54) POINTING DEVICE HOUSED IN A WRITING DEVICE

(75) Inventor: Michael L. Peterson, El Dorado, KS (US)

(73) Assignee: LSI Corporation, Milpitas, CA (US)

( * ) Notice: Subject to any disclaimer, the term of this patent is extended or adjusted under 35 U.S.C. 154(b) by 680 days.

(21) Appl. No.: 12/276,490

(22) Filed: Nov. 24, 2008

(65) Prior Publication Data

US 2010/0127978 A1    May 27, 2010

(51) Int. Cl.
*G06F 3/033* (2006.01)

(52) U.S. Cl. ......... 345/158; 345/169; 345/173; 345/164

(58) Field of Classification Search ............ 345/156, 345/157, 163, 179, 158, 173, 164, 169; 463/31, 463/36, 42, 37; 600/595; 702/127; 715/786; 382/124

See application file for complete search history.

(56) References Cited

U.S. PATENT DOCUMENTS

| | | | | |
|---|---|---|---|---|
| 5,936,612 | A * | 8/1999 | Wang | 345/164 |
| 6,208,328 | B1 * | 3/2001 | Kawachiya et al. | 345/157 |
| 7,774,155 | B2 * | 8/2010 | Sato et al. | 702/127 |
| 2001/0045965 | A1 * | 11/2001 | Orbanes et al. | 345/841 |
| 2003/0202001 | A1 * | 10/2003 | Takeuchi et al. | 345/700 |
| 2004/0140962 | A1 * | 7/2004 | Wang et al. | 345/179 |
| 2005/0062719 | A1 * | 3/2005 | Hinckley et al. | 345/163 |
| 2005/0190144 | A1 * | 9/2005 | Kong | 345/156 |
| 2006/0125789 | A1 * | 6/2006 | Tu et al. | 345/158 |
| 2006/0178212 | A1 * | 8/2006 | Penzias | 463/37 |
| 2007/0236472 | A1 * | 10/2007 | Bentsen et al. | 345/173 |
| 2007/0238529 | A1 * | 10/2007 | Iwamoto et al. | 463/42 |
| 2007/0259717 | A1 * | 11/2007 | Mattice et al. | 463/36 |
| 2010/0001960 | A1 * | 1/2010 | Williams | 345/173 |
| 2010/0027854 | A1 * | 2/2010 | Chatterjee et al. | 382/124 |
| 2010/0031186 | A1 * | 2/2010 | Tseng et al. | 715/786 |
| 2010/0066672 | A1 * | 3/2010 | Schoolcraft et al. | 345/158 |
| 2010/0152622 | A1 * | 6/2010 | Teulings | 600/595 |
| 2010/0261526 | A1 * | 10/2010 | Anderson et al. | 463/31 |

* cited by examiner

*Primary Examiner* — Thuy Pardo
(74) *Attorney, Agent, or Firm* — Christopher P. Maiorama, PC

(57) ABSTRACT

A method for controlling a pointing icon in a computer, including the steps of (A) establishing a wireless connection between a pointing device and the computer, (B) generating directional information through one or more three dimensional movements of the pointing device, (C) transmitting the directional information from the pointing device to the computer and (D) translating the directional information into movements of the pointing icon on a screen of the computer using a device driver program stored on the computer.

20 Claims, 5 Drawing Sheets

2(a)

2(b)

2(c)

2(d)

2(e)

2(f)

2(g)

2(h)

2(i)

3(a)

3(b)

POINTING DEVICE HOUSED IN A WRITING DEVICE

FIELD OF THE INVENTION

The present invention relates to computer interface devices generally and, more particularly, to a method and/or apparatus for implementing a pointing device housed in a writing device.

BACKGROUND OF THE INVENTION

An existing problem for users of portable computers is having access to a pointing device (i.e., a traditional mouse) for controlling the pointer on a screen. Most computers have inputs for a traditional mouse (i.e., a roller-ball mouse, an optical mouse, etc.). Laptop computers often have touch pads, which simulate the movement of a mouse via the movement of the finger of a user on a pad.

What works for one user may not always work for another. A regular mouse can provide convenient access for one user, but not all users want to keep track of an external mouse when moving the computer from place to place. Certain users may not like using a touch pad, perhaps due to the lack of tactile feedback from the device.

It would be desirable to implement a method and/or apparatus for implementing a pointing device housed in a writing device.

SUMMARY OF THE INVENTION

The present invention concerns a method that includes an example embodiment for controlling a pointing icon in a computer, comprising the steps of (A) establishing a wireless connection between a pointing device and the computer, (B) generating directional information through one or more three dimensional movements of the pointing device, (C) transmitting the directional information from the pointing device to the computer and (D) translating the directional information into movements of the pointing icon on a screen of the computer using a device driver program stored on the computer.

The objects, features and advantages of the present invention include providing a pointing device that may (i) be implemented in the housing of a pen, (ii) have the same capabilities as a generic computer mouse, (iii) wirelessly connect to a computer, (iv) have a gadgety appeal, (v) eliminate the need to transport a separate mouse and writing device, (vi) enable scroll-wheel functionality and/or (vii) be housed within a standard writing utensil.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
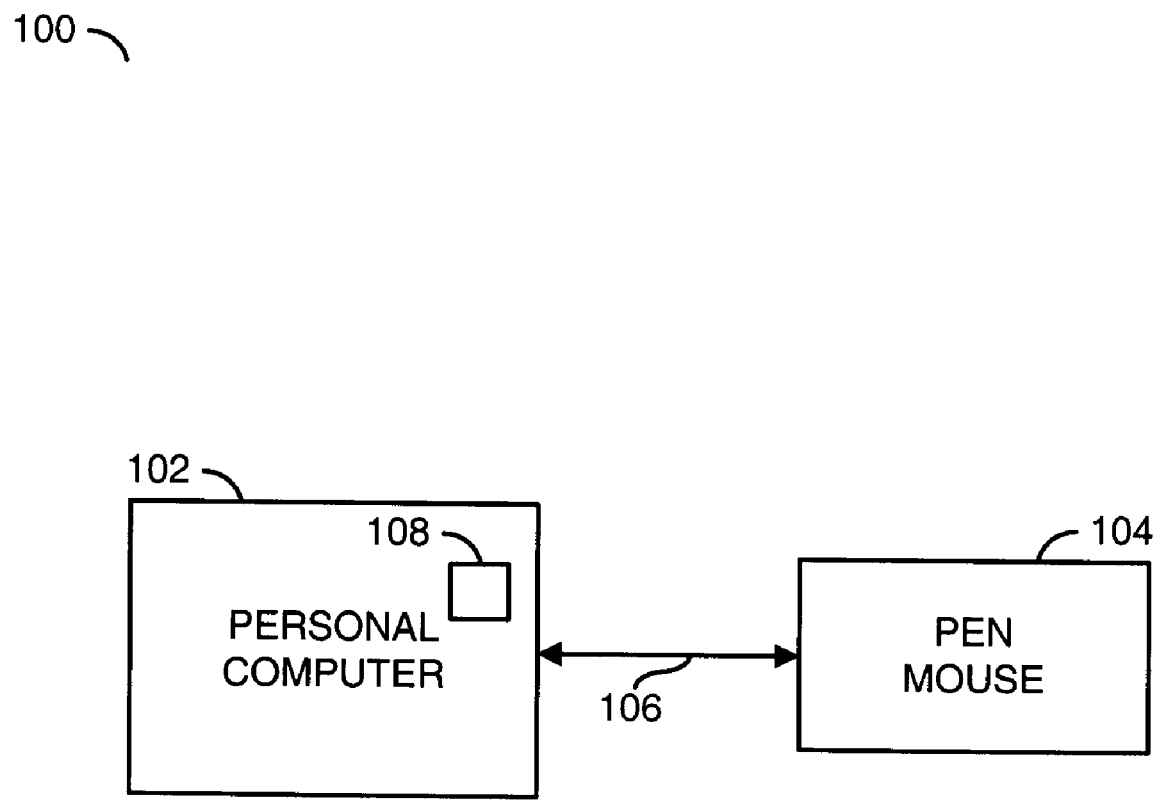
FIG. 1 is a block diagram illustrating an embodiment of the present invention.

Referring to FIG. 1, a block diagram of a system 100 is shown in accordance with a preferred embodiment of the present invention. The system 100 includes a block 102, a block 104, and a network 106. The block 102 may be implemented as a computer (e.g., a personal computer). In one example, the block 102 may be implemented as a portable computer (e.g., a laptop computer, a notebook computer, a handheld computer, etc.). The block 102 generally includes a block 108. The block 108 may be implemented as an antenna. In one example, the antenna 108 may broadcast a Bluetooth signal. The block 104 may be implemented as a mouse or other pointing device (e.g., stylus, trackball, etc.). In one example, the mouse 104 may be implemented as a pen mouse. The network 106 may be implemented as a wireless network. In one example, the network 106 may be implemented as a Bluetooth network. Other types of wireless networks (e.g., wireless USB, etc.) may be implemented to meet the design criteria of a particular implementation. The blocks 102, 104, 106, and/or 108 may be implemented as a circuit, a hardware device, a software device, and/or a combination of hardware and/or software.

In one example, the pen mouse 104 may be a computer interface device that may have capabilities similar to a generic computer mouse. In one example, the pen mouse 104 may be housed within the space defined by a standard-sized pen (e.g., ballpoint, rollerball, etc.) with a cap. However, the particular size of the pen mouse 104 may be varied to meet the design criteria of a particular implementation. The pen mouse 104 may have a wireless connection to connect to the personal computer 102. The pen mouse 104 may control the computer 102. In one example, the wireless connection 106 may be established via Bluetooth (or other comparable wireless standards). The personal computer 102 may be capable of interfacing directly with Bluetooth devices (e.g, computers with built-in Bluetooth radio antennas, add-on Bluetooth cards, etc.). In one example, the computer 102 may implement an add-on wireless antenna (not shown) to provide wireless capability. The pen mouse 104 may transmit movement information to the personal computer 102.

Referring to FIG. 2, a more detailed diagram of the system 100 illustrating three dimensional movements of an embodiment of the present invention is shown. FIG. 2(a) illustrates the personal computer 102, the pen mouse 104, and the network 106. The pen mouse 104 may control a pointer 120 (e.g., cursor, arrow, etc.) of the personal computer 102. FIG. 2(a) illustrates the pen mouse 104 in an original position (e.g., horizontal).

The pen mouse 104 may establish a wireless connection to the personal computer 102 via the network 106. In one example, the network 106 may be a wireless network (e.g., Bluetooth). The pen mouse 104 may generate data (e.g., directional information) in response to a three dimensional movement of the pen mouse 104. The directional information data may be transmitted via the network 106 to the personal computer 102. The computer 102 may translate the directional information data to control the computer 102. For example, the directional information data may be translated into movements of a pointing icon on a screen of the personal computer 102.

The personal computer 102 may use a device driver program stored on the personal computer 102 to translate the directional information data. When the pen mouse 104 is activated, the pen mouse 104 may generate a detection signal. The detection signal may be sent to the personal computer 102 over the wireless network 106. An operating system (e.g., Windows, Linux, Mac, etc.) running on the personal computer 102 may recognize the detection signal. The operating system may run an appropriate setup program to find a suitable device driver for the pen mouse 104. For example, the directional information data may be compatible with a pre-configured device driver of the operating system.

Figure 2A:
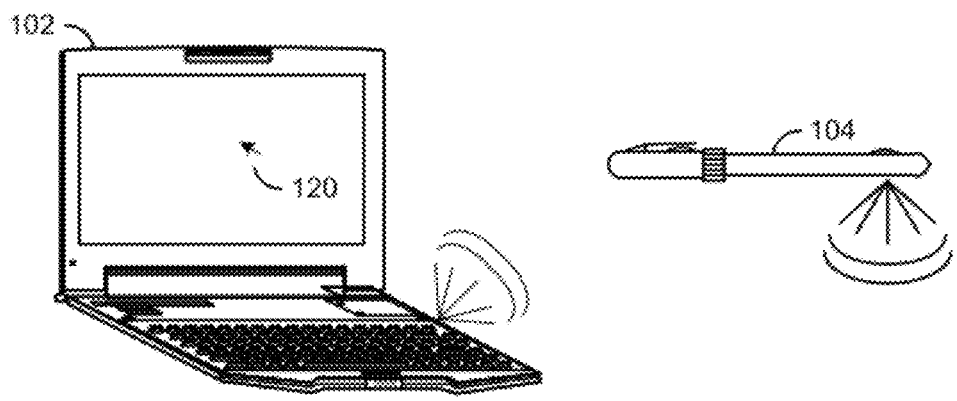
FIG. 2A through FIG. 2C are detailed diagrams (e.g., 2(a) through 2(i)) illustrating three dimensional movements of an embodiment of the present invention.
Figure 2A:
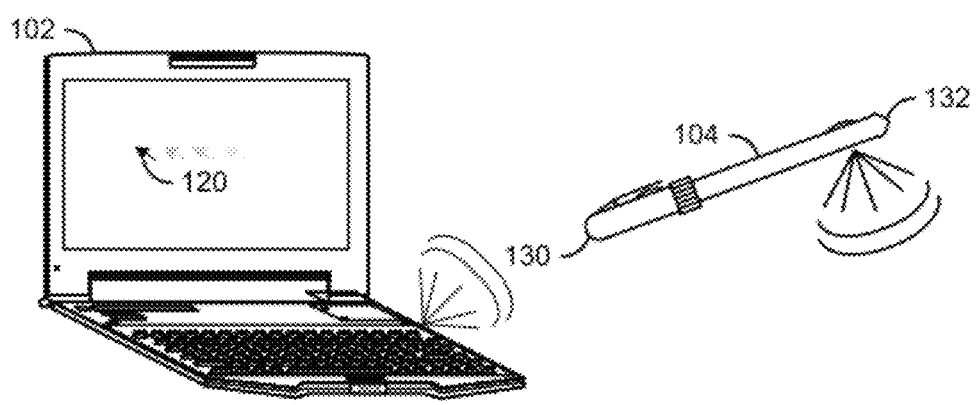
Figure 2A:
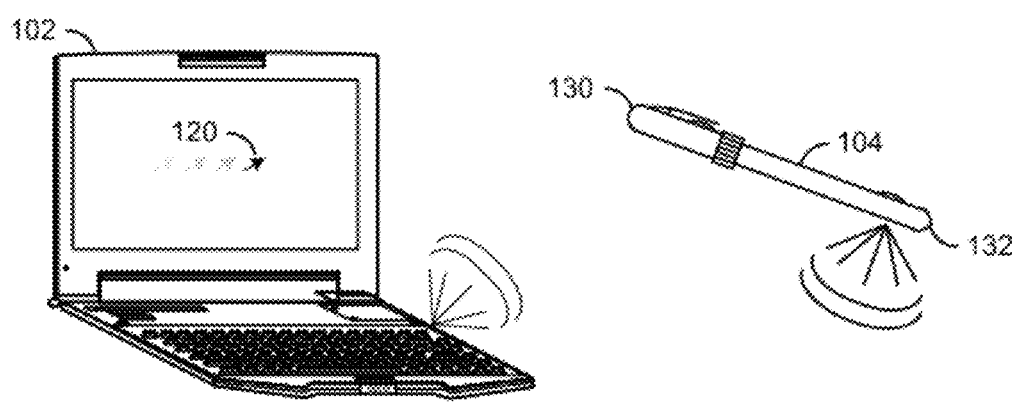
Figure 2B:
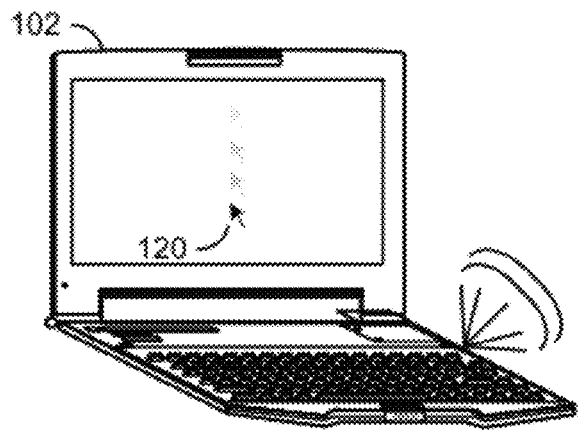
Figure 2B:
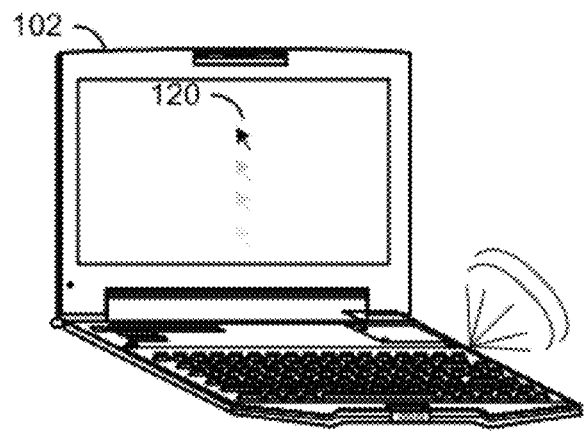
Figure 2B:
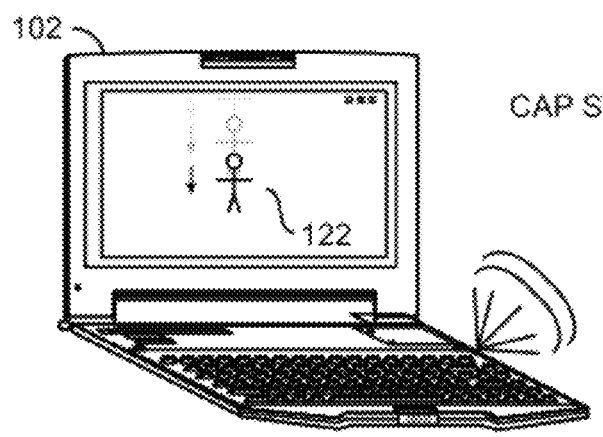

FIG. 2(b) illustrates the pointer 120 moving in a direction to the left. The pen mouse 104 is shown tilted to the left to initiate movement to the left. For example, a first end 130 (e.g., a cap) of the pen mouse 104 may be tilted to be lower than a second end 132 (e.g., a main body) of the pen mouse 104. When the first end 130 of the pen mouse 104 is lower than the second end 132 of the pen mouse 104, the pointer 120 may move in the left direction. In one example, the more the pen mouse 104 is tilted to the left, the faster the pointer 120 will move in the left direction. To stop the movement of the pointer 120 in the left direction, the pen mouse 104 may be moved back to the original position.

Figure 2C:
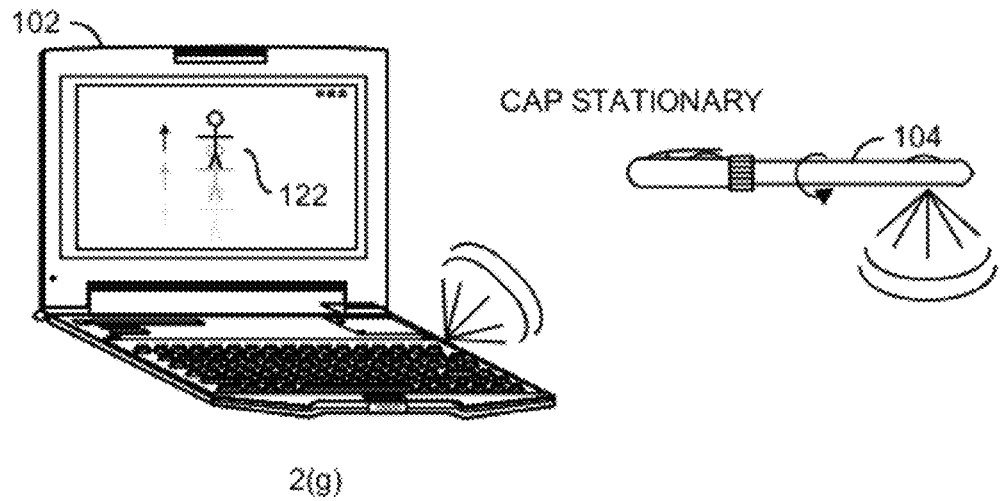
Figure 2C:
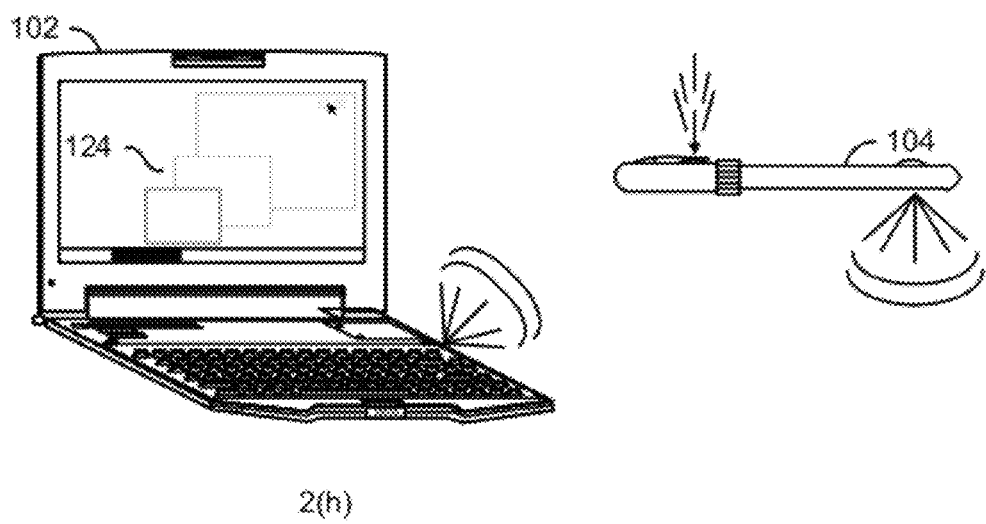
Figure 2C:
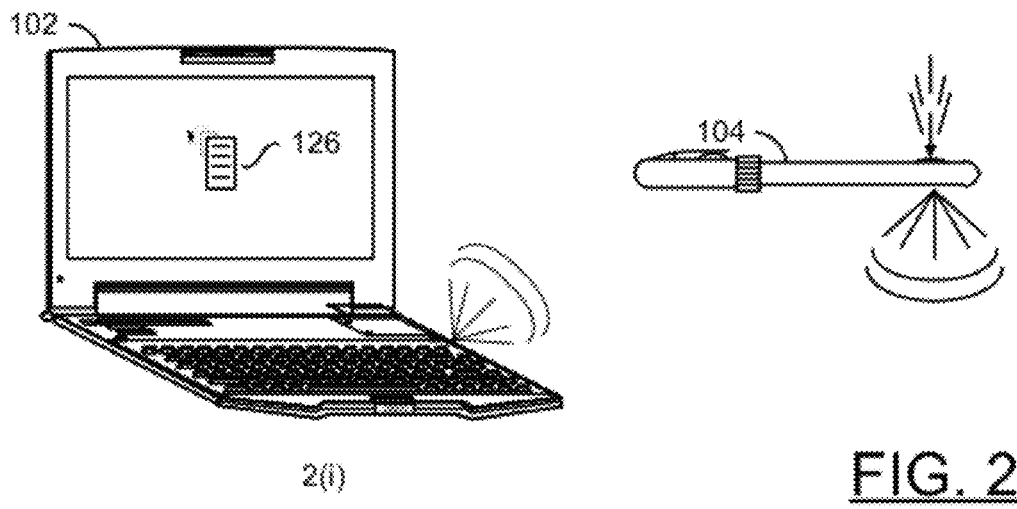

FIG. 2(c) illustrates the pointer 120 moving in a direction to the right. The pen mouse 104 may be tilted to the right to initiate movement to the right. The first end 130 of the pen mouse 104 may be moved higher than the second end 132 of the pen mouse 104. When the first end 130 of the pen mouse 104 is higher than the second end 132 of the pen mouse 104, the pointer 120 may move in a direction to the right. In one example, the more the pen mouse 104 is tilted to the right, the faster the pointer 120 will move in the right direction. To stop the movement of the pointer 120 in the direction to the right, the pen mouse 104 may be brought back to the original level position.

FIG. 2(d) illustrates the pointer 120 moving in a downward direction. The pen mouse 104 may be rolled in a motion away from a user. When the pen mouse 104 is rolled in the motion away from the user, the pointer 120 may move in the downward direction. In one example, the more the pen mouse 104 is rolled in the motion away from the user, the faster the pointer 120 will move in the downward direction. To stop the pointer 120 from moving in the downward direction, the user may bring the pen mouse 104 back to the original position. In one implementation, the pointer 120 may move in the downward direction when the first end 130 of the pen mouse 104 is rotated to the left (not shown).

FIG. 2(e) illustrates the pointer 120 moving in an upward direction. The pen mouse 104 may be rolled in a motion towards the user. When the pen mouse 104 is rolled in the motion towards the user, the pointer 120 may move in the upward direction. In one example, the more the pen mouse 104 is rolled in the motion towards the user, the faster the pointer 120 will move in the upward direction. To stop the pointer 120 from moving in the upward direction, the user may bring the pen mouse 104 back to the original position. In one implementation, the pointer 120 may move in the upward direction when the first end 130 of the pen mouse 104 is rotated to the right (not shown).

FIG. 2(f) illustrates an image 122 being scrolled down. The pen mouse 104 may be rolled in a motion away from the user while the first end 130 is held stationary. When the pen mouse 104 is rolled in the motion away from the user while the first end 130 is stationary, the image 122 may be scrolled down. In one example, the image 122 may be scrolled down continuously as the pen mouse 104 is rolled. In another example, the image 122 may be scrolled down automatically after the pen mouse 104 is rolled a certain amount. To stop the image 122 from being scrolled down, the user may roll the pen mouse 104 back to the original position.

FIG. 2(g) illustrates the image 122 being scrolled up. The pen mouse 104 may be rolled in a motion towards the user while the first end 130 is held stationary. When the pen mouse 104 is rolled in the motion towards the user while the first end 130 is stationary, the image 122 may be scrolled up. In one example, the image 122 may be scrolled up continuously as the pen mouse 104 is rolled. In another example, the image 122 may be scrolled up automatically after the pen mouse 104 is rolled a certain amount. To stop the image 122 from being scrolled up, the user may roll the pen mouse 104 back to the original position.

FIG. 2(h) illustrates a window 124 being minimized. The window 124 may be minimized when a left-mouse button 134 is clicked. The left-mouse button 134 may be located on the first end 130 of the pen mouse 104. For example, when the left-mouse button 134 is pressed, the pointer 120 may select a particular function of the personal computer 102. In another example, when the left-mouse button 134 is pressed, the pointer 120 may highlight some text. Various functions may be carried out by the left-mouse button 134.

FIG. 2(i) illustrates an effect of clicking a right-mouse button 136 on the pen mouse 104. An options menu 126 is shown being maximized as the right-mouse button 136 is being pressed. The right-mouse button 136 may perform the functions associated with a right-mouse click.

In one example, the pen mouse 104 may incorporate a custom configured device driver. The custom configured device driver may be configured to interpret the directional information data. In one example, the custom configured device driver may be customized by a user. The custom configured device driver may interpret a variety of three dimensional movements in addition to the movements described above. For example, the user may configure the device driver to recognize a slashing motion with the pen mouse 104. The slashing motion may be configured to perform a specific computer task, such as automatically scrolling to an end of a document. In another example, the user may configure the device driver to recognize when the pen mouse 104 is being fluttered (e.g., a rapid pattern of movement about an axis). The fluttering motion may trigger another specific computer task. For example, the flutter may cause the personal computer 102 to close a current window.

Figure 3:
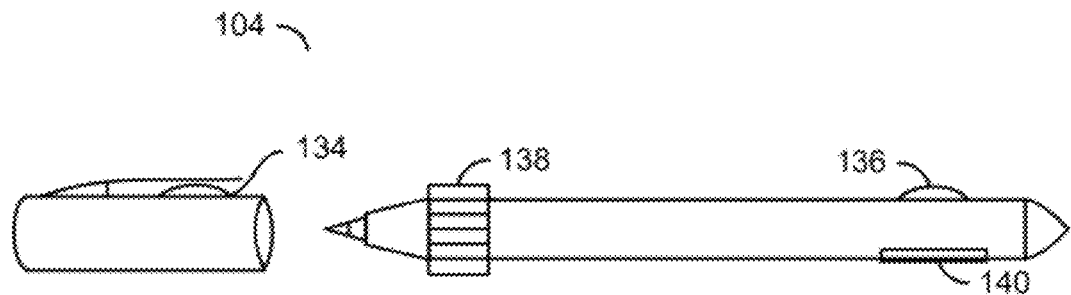
FIG. 3 is a more detailed diagram of an embodiment of the present invention shown as 3(a) and 3(b).
Figure 3:
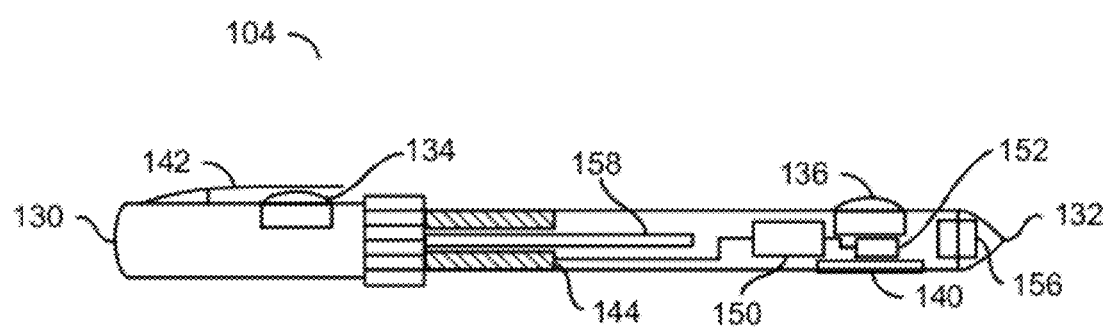

Referring to FIG. 3, a more detailed diagram of the pen mouse 104 is shown. FIG. 3(a) illustrates the general components of the pen mouse 104. FIG. 3(b) illustrates the internal electrical components of the pen mouse 104. The pen mouse 104 further comprises a rotating ring 138, a power switch 140, and a clip 142. The rotating ring 138 may attach to the first end 130. The rotating ring 138 may contain an electrical connection between the first end 130 and a main body of the pen mouse 104. Disconnecting the first end 130 may disconnect an electrical connection and power down the powered parts of the pen mouse 104. The smooth rotational ability of the rotating ring 138 may enable a scroll-wheel like function and may be easy to use. The power switch 140 (e.g., master on/off switch) may be provided on the main body of the pen mouse 104. The power switch 140 may turn off the mouse functions of the pen mouse 104. Turning off the pen mouse 104 may save power. Turning off the pen mouse may reduce the chance of interfering with another device when not being actively used.

The pen mouse 104 may generate three dimensional movements used by the computer 102. A motion accelerometer 144 (or sensor) may be built into the pen mouse 104. The accelerometer 144 may be implemented as a sensor configured to generate a signal in response to a particular motion. In one example, a plurality of motion accelerometers 144 may be implemented. The three dimensional movements of the pen mouse 104 may be captured by the accelerometer 144. The accelerometer 144 may translate the three dimensional movements of the pen mouse 104 into an electrical signal (e.g., a movement signal). The movement signal may be sent to a processor 150. The processor 150 may generate the directional information data in response to the movement signal. The directional information data may be transmitted through an antenna 152.

The particular movement signal transmitted between the accelerometer 144 and the processor 150 may depend on the particular type of accelerometer implemented. For example, an analog accelerometer 144 may vary a voltage in response to the amount of G force measured. A wire/connection may be implemented for each axis between the accelerometer 144 and the processor 150. A digital accelerometer 144 may implement a modulated voltage signal to indicate similar G force information. The particular type of accelerometer 144 and the particular type of movement signal may be varied based on the implementation of the pen mouse 104. The particular size of the accelerometer 144 may also be varied. The processor 150 may be used to translate a variety of types of movement information into directional information data in a format that may be transmitted through the antenna 152.

In general, an accelerometer 144 that measures three axes may be implemented. In one example, two accelerometers 144 that each measure two axes may be implemented. The two accelerometers 144 may be implemented at right angles to each other within the pen mouse 104. Cost and/or power and/or space constraints may be used when designing a particular configuration for the accelerometer 144.

The directional information data sent to the antenna 152 (and then to the antenna 108 on the computer 102) may represent the current angle of tilt for all three axes of the pen mouse 104. A device driver on the computer 102 may use the directional information data, along with previous values (e.g., of directional information data) sent, to determine a rate of change. The rate of change may be used to determine where the pointer 120 moves on the screen of the computer 102. In one example, the accelerometer 144 and the processor 150 may be combined.

A battery 156 may also be implemented. The battery 156 may supply power to the electrical components of the pen mouse 104. In one example, the battery 156 may be located within the main body of the pen mouse 104. When the pen mouse 104 is used to write, the first end 130 may be removed. Removing the first end 130 may power down the electrical components of the pen mouse 104. When the pen mouse 104 is powered down, the mouse functions of the pen mouse 104 may be disabled. Disabling the mouse functions while writing may avoid inadvertent mouse functions from occurring.

The pen mouse 104 may combine a writing implement (e.g., a pen or other ordinary writing utensil) and a pointing device (e.g., a computer mouse) into a single device. The pointing device may be assembled in a housing of the writing implement. The pen mouse 104 may alleviate a need to transport a separate mouse and/or writing utensil when transporting the computer 102. The pen mouse 104 may include an ink cartridge 158. The pen mouse 104 may be able to function as a normal writing instrument when the first end 130 of the pen mouse 104 has been removed. In one example, a tip of the second end 132 of the pen mouse 104 may be removed to allow replacement of the ink cartridge 158. The pen mouse 104 may have a certain "gadgety" appeal to some users.

In one example, the pen mouse 104 may be reconfigurable by a user (e.g., a left-handed user). The pen mouse 104 may be reconfigured to allow a variety of functions available with a regular mouse. For example, the reconfiguration may be done through a software driver located on the computer 102. In another example, the reconfiguration may be implemented as a hardware switch on the pen mouse 104. The user may flip the pen mouse 104 around and have the pen mouse 104 point in another direction. Flipping the pen mouse 104 may allow the user to reverse the functions of the pen mouse 104.

In one example, the pen mouse 104 may be activated in the original position (e.g., held horizontally). However, the pen mouse 104 may be activated in several different positions. The position the user activates the pen mouse 104 may depend on what the user wants the pen mouse 104 to be doing when activated. The processing of a position signal by the accelerometer 144 may take into account different situations (e.g., a dead zone). The pen mouse 104 may not start to respond until the user may have the pen mouse 104 left or right of a certain angle.

In another example, a rate of change of a position of the pen mouse 104 may accelerate when the user tips the pen mouse 104. When rotating the pen mouse 104 (e.g., for up-down movements, scrolling, etc.), the accelerometer 144 may base the movement of the pen mouse 104 in relation to a change compared with an initial angle. The starting point for the movements may be the position of the pen mouse 104 when activated. The accelerometer 144 may take into account how the pen mouse 104 is rotated.

The rotation of the rotating ring 138 may be a motion that enables a scroll-wheel functionality to work. In one example, the ring 138 may rotate with respect to the first end 130 of the pen mouse 104. The first end 130 may plug into the rotating ring 138. A user may hold the first end 130 (e.g., the rotating ring 138 may be stationary), and turn the main body 132 of the pen mouse 104. The main body 132 of the pen mouse 104 may rotate while the user holds the first end 130 of the pen mouse 104 stationary. For example, the user may rotate the main body 132 of the pen mouse 104 underneath the rotating ring 138. The same functionality may be achieved if, instead of holding the first end 130 (and rotating ring 138) still and rotating the main body 132, the user holds the main body 132 still and rotates the first end 130 (and rotating ring 138) in an opposite direction.

In one implementation, the ring 138 may be rotated independently of the first end 130 and the second end 132. For example, the ring 138 may be rotated with the thumb of a user. The ring 138 may be rotated without having to move the main body 132 of the pen mouse 104. Rotating the ring 138 independent of the first end 130 and the second end 132 may be similar to an actual motion of a conventional mouse. In another example, the ring 138 may have multiple layers (e.g., a top ring, and a lower ring that connects to the body of the pen mouse 104). The movement of the top ring (with relation the bottom ring) may cause the scroll-wheel functionality. The above mentioned implementations may all be used to implement the scroll-wheel functionality.

The processor 150 may be located between the ink cartridge 158 and the battery 156. The size of the processor 150 (and/or the RF/Bluetooth transmitter) may define the physical size of the pen mouse 104. For example, as a concession to space, the pen mouse 104 may be long/wide enough to account for such components. The ink cartridge 158 may be shorter than a normal replacement cartridge to allow for more space to hold the internal components of the pen mouse 104. If the electronics of the pen mouse 104 use extra battery power, a USB port may be implemented on the pen mouse 104. In one example, the USB port may be located at the second end 132 of the pen mouse 104.

While the invention has been particularly shown and described with reference to the preferred embodiments thereof, it will be understood by those skilled in the art that various changes in form and details may be made without departing from the scope of the invention.

The invention claimed is:

1. A method for controlling a pointing icon in a computer, comprising the steps of:
   (A) establishing a wireless connection between a pointing device and said computer;
   (B) generating (i) directional information and (ii) computer task information in addition to said directional information, both in response to one or more three dimensional movements of said pointing device, wherein (i) said three dimensional movements are detected using one or more accelerometers located inside said pointing device and (ii) said directional information and said computer task information are both generated in response to the same one or more three dimensional movements;
   (C) transmitting said directional information from said pointing device to said computer;
   (D) translating said directional information into movements of said pointing icon on a screen of said computer using a device driver program stored on said computer; and
   (E) translating said computer task information into a command to perform a specific task on said computer.

2. The method according to claim 1, wherein said computer task information is generated by one or more of the following sub-steps:
   (A) tilting said pointing device so that a first end of said pointing device is lower than a second end of said pointing device;
   (B) tilting said pointing device so that said first end of said pointing device is higher than said second end of said pointing device;
   (C) rolling said pointing device in a motion away from a user; and
   (D) rolling said pointing device in a motion towards said user.

3. The method according to claim 2, wherein said computer task information is further generated by:
   rolling said pointing device away from said user while holding said first end stationary.

4. The method according to claim 2, wherein said computer task information is further generated by:
   rolling said pointing device towards said user while holding said first end stationary.

5. The method according to claim 2, wherein said computer task information is further generated by:
   pushing down on a button on said first end to mimic a left-mouse button, wherein said button does not initiate any directional information.

6. The method according to claim 2, wherein said computer task information is further generated by:
   pushing down on a button on a writing portion of said pointing device to mimic a right-mouse button, wherein said pointing device is held away from any fixed objects.

7. The method according to claim 2, wherein said computer task information is further generated by:
   slashing said pointing device in a downward direction to scroll to an end of a document on said computer.

8. The method according to claim 2, wherein said computer task information is further generated by:
   fluttering said pointing device to close a current window of said computer.

9. The method according to claim 1, wherein said device driver comprises a pre-configured device driver in a particular operating system of said computer.

10. The method according to claim 9, wherein said computer task information is compatible with said pre-configured device driver.

11. The method according to claim 1, wherein said device driver comprises a custom configured device driver configured to interpret said directional information.

12. The method according to claim 1, wherein said wireless connection comprises a Bluetooth connection.

13. The method according to claim 1, wherein said computer task information is configured to perform tasks within an operating system of said computer.

14. The method according to claim 13, where in said computer task information (i) is generated using only said accelerometers and (ii) avoids the need for a dedicated mouse click button.

15. An apparatus comprising:
   a housing;
   one or more accelerometers located inside said housing and configured to generate one or more movement signals;
   a processor configured to generate (i) directional information and (ii) computer task information in addition to said directional information, both in response to said one or more movement signals, wherein (i) said movement signals are generated using one or more accelerometers located inside said housing and (ii) said directional information and said computer task information are both generated in response to the same one or more movement signals; and
   an antenna configured to transmit said directional information to a computer through a wireless connection between said apparatus and said computer.

16. The apparatus according to claim 15, wherein said housing is in the shape of a pen.

17. The apparatus according to claim 15, wherein said computer comprises a device driver program.

18. The apparatus according to claim 17, wherein said device driver comprises a pre-configured device driver in a particular operating system of said computer.

19. The apparatus according to claim 18, wherein said directional information is compatible with said pre-configured device driver.

20. The apparatus according to claim 17, wherein said device driver comprises a custom configured device driver configured to interpret said directional information.

* * * * *